Sept. 30, 1924.
W. A. GEIGER
1,510,267
SHOCK ABSORBING MECHANISM
Filed Nov. 12, 1921
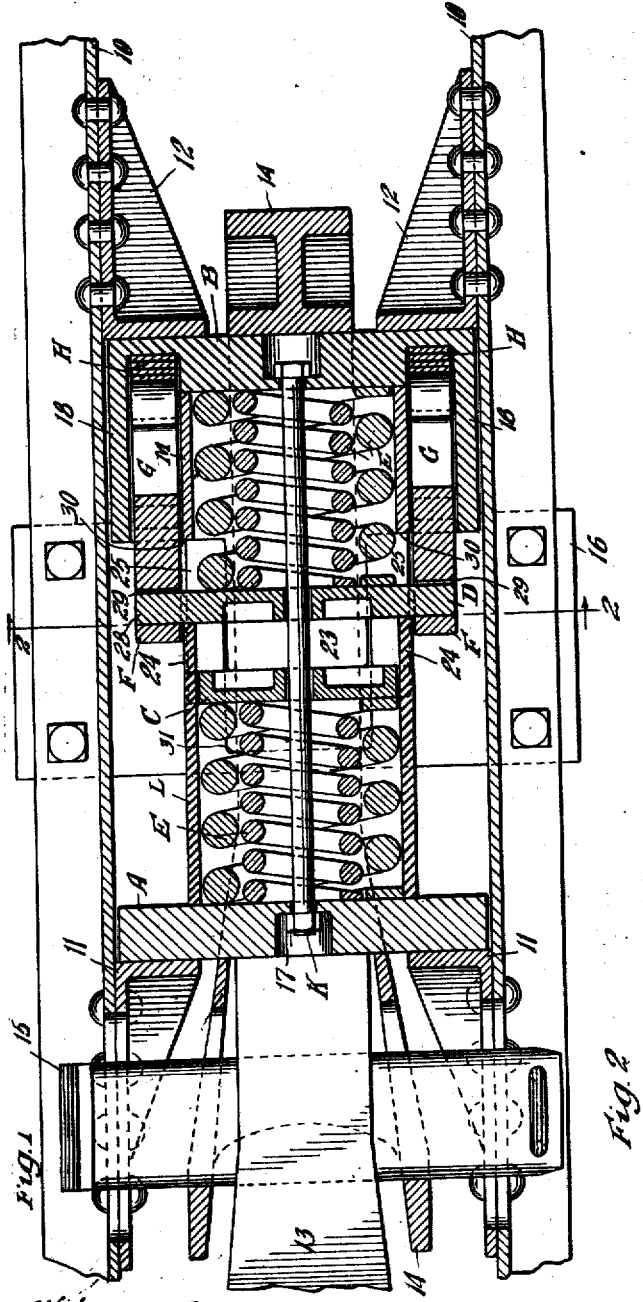
Witnesses
Hans M. Dachlitz
Inventor
William A. Geiger
By Geo. J. Haight
his Atty Patented Sept. 30, 1924.

1,510,267

UNITED STATES PATENT OFFICE.

WILLIAM A. GEIGER, OF CHICAGO, ILLINOIS, ASSIGNOR, BY MESNE ASSIGNMENTS, TO W. H. MINER, INC., A CORPORATION OF DELAWARE.

SHOCK-ABSORBING MECHANISM.

Application filed November 12, 1921. Serial No. 514,436.

*To all whom it may concern:*

Be it known that I, WILLIAM A. GEIGER, a citizen of the United States, residing at Chicago, in the county of Cook and State of Illinois, have invented a certain new and useful Improvement in Shock-Absorbing Mechanisms, of which the following is a full, clear, concise, and exact description, reference being had to the accompanying drawings, forming a part of this specification.

This invention relates to improvements in shock absorbing mechanisms.

One object of the invention is to provide a combined friction and tandem spring shock absorbing mechanism especially adapted for railway draft riggings.

Another object of the invention is to provide a shock absorbing mechanism especially adapted for railway draft riggings wherein are combined friction devices and a tandem spring gear so arranged that only one set of front and rear stop-acting means is required.

Other objects of the invention will more clearly appear from the description and claims hereinafter following.

In the drawing forming a part of this specification, Figure 1 is a horizontal, longitudinal, sectional view of a portion of a railway draft rigging showing my improvements in connection therewith. Figure 2 is a vertical transverse sectional view corresponding to the section line 2—2 of Figure 1. And Figure 3 is a longitudinal vertical sectional view corresponding to the section line 3—3 of Figure 2.

In said drawing, 10—10 denote channel draft sills of a railway car underframe to the inner faces of which are secured front stop lugs 11—11 and rear stop lugs 12—12. A portion of a drawbar is indicated at 13, the same being operatively associated with the shock absorbing mechanism proper by a hooded cast yoke 14 and coupler key 15. The movable parts of the draft rigging are supported in operative position by a detachable saddle plate 16.

The improved shock absorbing mechanism, as shown, comprises, broadly, a front main follower A; a rear main follower B; a front intermediate follower C; a rear intermediate follower D; tandem arranged springs E—E; wedges F—F; friction shoes G—G; auxiliary springs H—H; anti-friction rollers J—J; a retainer bolt K; and two column-pressure-transmitting members L and M.

The front follower A is of ordinary rectangular form and suitably recessed as indicated at 17 to accommodate the nut of the retainer bolt K. The head of the bolt K is seated in a corresponding recess formed in the rear follower B.

The rear main follower B, as shown, is of special form. At each end, it is provided with forwardly extended outer side flanges 18—18 and top and bottom flanges 19—19. The latter provide longitudinally extending upper and lower sets of friction surfaces 20—20 on their inner sides, as best indicated in Figure 3, and with which the friction shoes G are adapted to cooperate. The springs H, of curved plate form as shown in Figure 3, are seated within the pockets provided by the flanges 18 and 19 and yieldingly resist relative longitudinal movement between the shoes G and the follower B. The two wedges F are of like construction and each has a pair of converging wedge faces 21, the anti-friction rollers J being interposed between said wedge surfaces and the opposed wedge surfaces 22 on the shoes G. With the construction just described, it is evident that I provide two sets of friction devices, one on each side of the tandem spring gear proper, said two sets of friction devices being in twin arrangement. The two column-pressure-transmitting members L and M are preferably of like construction, each in the form of a casting and open at each end. Said members L and M have their interiors of cylindrical form to accommodate the two springs E—E and properly center the latter. At their inner or adjacent ends, that is, midway between the two main followers A and B, the column members L and M are longitudinally recessed on opposite sides so that the rear column member M, for instance, provides forwardly extended upper and lower walls or arms 23—23 as shown in section in Figure 2. The other column member L is turned through an arc of 90° with respect to the column member M and the corresponding arms of said member L, as indicated at 24—24 in Figure 1, will work between the arms 23 of the column member M. The edges of the arms 23 and 24 are beveled as indicated at 25 in Figure 2, said beveled edges extending in planes corresponding to diagonals of a square which in turn corresponds to the outer contour of the members L and M.

The rear intermediate follower D, as shown in Figures 1 and 2, is of generally circular form at the center as indicated at 26 to adapt it to slide freely within the column member M. In addition, the follower D is provided with laterally extended wings 27—27 having the upper and lower edges thereof beveled or inclined as indicated at 125 so that said wings 27 slide freely within the longitudinal side recesses of the member M. The follower D also has square lugs 28—28 on each side thereof extended laterally from the wings 27, as shown in Figure 2, said lugs 28 entering correspondingly shaped openings 29 in the wedges F so that the latter are actuated simultaneously and uniformly with the follower D.

The front intermediate follower C is of the same construction as the follower D except that it is not provided with any lugs 28 and the follower C is turned 90° with respect to the follower D so that the wings of the follower C will work in the longitudinal recesses of the column member L.

In normal condition of the parts, the rear intermediate follower D bears against the inner ends of the arms 24 of the column member L and said follower D is spaced from the bottom ends 30 of the longitudinal recesses in the column member M a distance corresponding to the permissible stroke of the draft rigging. Similarly, the front intermediate follower C bears upon the forward ends of the arms 23 of the column member M and is spaced from the forward edges 31 of the longitudinal recesses in the column member L, a distance corresponding to the permissible stroke of the draft rigging.

It will be noted that the retainer bolt K passes thru the intermediate followers C and D and because of this, performs a function in addition to its usual one of maintaining all of the parts of the proper over-all length since the retainer bolt K will prevent the springs and column members and intermediate followers from shifting laterally with respect to the front and rear main followers A and B.

The operation of the arrangement is as follows, assuming an inward or buffing movement of the drawbar. As the front follower A moves rearwardly, the rear intermediate follower D is moved simultaneously therewith, thus compressing the rear spring E, the rear end of which is held against the then stationary main follower B. The front intermediate follower C, being held at a fixed distance from the rear main follower B by the column member M, acts as a fixed abutment or stationary follower for the rear end of the front spring E so that the latter will be compressed as the front follower A moves rearwardly. In the manner just described, it is evident that I obtain a tandem spring action while employing only one set of stop-acting means.

As the rear intermediate follower D is moved rearwardly in the manner above described, it forces the two side wedges F longitudinally therewith, thus actuating the friction devices in which the shoes are yieldingly resisted by the supplemental springs H. As the parts return to normal position, the rear intermediate follower D will pull the wedges F outwardly therewith, thus relieving the wedging action on the shoes G and the springs H will of course help to restore the shoes G to normal position although the shoes will be dragged in any event by the wedges F on account of the anti-friction rollers and shoulders on opposite sides thereof as clearly shown in Figure 3. Because of this particular arrangement wherein the wedges F are subject to the action of the rear spring E during release, the angle of the wedge faces on the wedges F and shoes G may be made relatively keen to create high frictional capacity even though the springs H are of light capacity, the main function of the latter being to insure maintaining all of the friction elements in taut condition in full release and the shoes in sufficiently tight engagement with the friction surfaces 20 that they will immediately cooperate with the friction surfaces when the wedges F are forced rearwardly.

From the preceding description, it will be seen that the twin disposed friction devices are operated in twin arrangement with the tandem spring gear without the use of any additional stop lugs or modifications of the yoke. By my arrangement, I am enabled to obtain greater capacity than would be obtained with the spring gear alone and I utilize space at the sides of the spring gear which would otherwise remain unused.

I have herein shown and described what I now consider the preferred manner of carrying out the invention, but the same is by way of illustration only and not by way of limitation. All changes and modifications are contemplated that come within the scope of the claims appended hereto.

I claim:

1. In a shock absorbing mechanism, the combination with tandem arranged springs, of tandem arranged front main and rear intermediate followers and means for maintaining them at a uniform distance apart; tandem arranged front intermediate and rear main followers and means for maintaining them at a uniform distance apart; and friction devices acting independently of said tandem arranged springs, said devices being interposed between one of the main followers and the correspondingly designated intermediate follower, one of said last named followers being provided with walls having friction faces thereon coacting with said devices.

2. In a shock absorbing mechanism, the combination with a tandem spring gear including front and rear main followers, front and rear intermediate followers and springs; of friction wedge means in twin arrangement with the tandem gear and operable simultaneously therewith; and springs independent of said first named springs coacting with said friction wedge means.

3. In a railway draft rigging, the combination with draft sills having one set only of rear and front stop-acting means; of front and rear main followers cooperable with said means; front and rear intermediate followers; tandem springs cooperable with the main and intermediate followers; column-acting means interposed between each main follower and the oppositely designated intermediate follower; and friction devices arranged and operable in twin with said tandem elements, said devices being actuated directly by one of said followers.

4. In a railway draft rigging, the combination with draft sills having one set only of rear and front stop-acting means; of front and rear main followers cooperable with said means; front and rear intermediate followers; tandem springs cooperable with the main and intermediate followers; column acting means interposed between each main follower and the oppositely designated intermediate follower; and twin disposed sets of friction devices arranged and operable in twin with said tandem elements, each set of devices comprising a wedging means and a plurality of friction shoes.

5. In a device of the character described, the combination with front and rear main followers; of front and rear intermediate followers; tandem arranged springs cooperable with said main and intermediate followers; a column-pressure-transmitting member between the front main and rear intermediate follower maintaining said followers at a uniform distance apart; a column-pressure-transmitting member between the rear main follower and the front intermediate follower arranged to maintain said followers at a fixed distance apart, the rear intermediate follower being slidable with respect to the rear column-pressure-transmitting member and the front intermediate follower being slidable with respect to the front column-pressure-transmitting member; and friction devices interposed between one of said intermediate followers and the correspondingly designated main follower.

6. In a device of the character described, the combination with front and rear main followers; of front and rear intermediate followers; tandem arranged springs cooperable with said main and intermediate followers; a column-pressure-transmitting member between the front main and rear intermediate follower maintaining said followers at a uniform distance apart; a column-pressure-transmitting member between the rear main follower and the front intermediate follower arranged to maintain said followers at a fixed distance apart, the rear intermediate follower being slidable with respect to the rear column-pressure-transmitting member and the front intermediate follower being slidable with respect to the front column-pressure-transmitting member; and friction devices interposed between one of said intermediate followers and the correspondingly designated main follower, said friction devices being duplicated on opposite sides of the adjacent column-pressure-transmitting member.

7. In a device of the character described, the combination with front and rear main followers; of front and rear intermediate followers; tandem arranged springs cooperable with said main and intermediate followers; a column-pressure-transmitting member between the front main and rear intermediate follower maintaining said followers at a uniform distance apart; a column-pressure-transmitting member between the rear main follower and the front intermediate follower arranged to maintain said followers at a fixed distance apart, the rear intermediate follower being slidable with respect to the rear column-pressure-transmitting member and the front intermediate follower being slidable with respect to the front column-pressure-transmitting member; and friction devices interposed between one of said intermediate followers and the correspondingly designated main follower, said friction devices including a friction shell integral with said main follower, friction shoes cooperable with said shell, and a wedge anchored to and movable in unison with said intermediate follower.

8. In a railway draft rigging, the combination with draft sills having one set only of rear and front stop acting means; of front and rear main followers co-operable with said means; front and rear intermediate followers; tandem springs co-operable with the main and intermediate followers; column acting means interposed between each main follower and the oppositely designated intermediate follower; and a friction device arranged and operable in twin with said tandem elements additional spring elements cooperating with each of said friction devices, said tandem springs, column acting means, followers, friction devices and additional springs being bodily removable downwardly as a unit from between the sills.

In witness that I claim the foregoing I have hereunto subscribed my name this 26th day of October, 1921.

WILLIAM A. GEIGER.

Witnesses:
UNA C. GRIGSBY,
ANN BAKER.